(12) United States Patent
Koren

(10) Patent No.: US 6,795,495 B2
(45) Date of Patent: Sep. 21, 2004

(54) LINE DRIVER WITH OUTPUT IMPEDANCE SYNTHESIS

(75) Inventor: Victor Koren, Ra'anana (IL)

(73) Assignee: Tioga Technologies, Inc., San Jose, CA (US)

(*) Notice: Subject to any disclaimer, the term of this patent is extended or adjusted under 35 U.S.C. 154(b) by 709 days.

(21) Appl. No.: 09/754,011

(22) Filed: Jan. 3, 2001

(65) Prior Publication Data

US 2002/0118732 A1 Aug. 29, 2002

Related U.S. Application Data

(60) Provisional application No. 60/234,882, filed on Sep. 25, 2000.

(51) Int. Cl.[7] .................................................. H04B 1/38
(52) U.S. Cl. ...................................... 375/219; 327/105
(58) Field of Search ................................ 375/219, 220, 375/221; 327/105, 108, 110, 304, 560, 561, 562, 563; 330/260, 265

(56) References Cited

U.S. PATENT DOCUMENTS

| | | | | |
|---|---|---|---|---|
| 4,317,205 A | | 2/1982 | Lam ............................... | 375/7 |
| 4,462,105 A | | 7/1984 | Wagner et al. ................. | 375/8 |
| 5,541,990 A | | 7/1996 | Rahamin ..................... | 379/402 |
| 5,579,336 A | | 11/1996 | Fitzgerald et al. ........... | 375/219 |
| 5,585,763 A | * | 12/1996 | Navabi et al. ............... | 330/255 |
| 5,838,722 A | | 11/1998 | Consi .......................... | 375/219 |
| 5,926,383 A | * | 7/1999 | Pilukaitis et al. ............. | 363/50 |
| 6,218,872 B1 | | 4/2001 | Koren ......................... | 327/108 |
| 6,307,408 B1 | | 10/2001 | Shamlou et al. ............. | 327/112 |
| 6,323,686 B1 | | 11/2001 | Bisson et al. ................ | 326/82 |

FOREIGN PATENT DOCUMENTS

EP          0901221          3/1999

OTHER PUBLICATIONS

Koren, Victor, "Line Driver Economically Synthesizes Impedance", *EDN–Design Ideas*, Jan. 6, 1994, p. 79.

* cited by examiner

*Primary Examiner*—Khai Tran
(74) *Attorney, Agent, or Firm*—Darby & Darby

(57) ABSTRACT

A driver for coupling a transceiver to a line, including a first amplifier having first and second inputs and a first output coupled to a first side of the line. The driver includes a second amplifier having a third input and a fourth input and a second output coupled to a second side of the line. The driver further includes a first voltage feedback resistor, connected between the first output and the second input, and a second voltage feedback resistor, substantially the same as the first voltage feedback resistor, connected between the second output and the fourth input. The driver also includes a series resistor, coupled between the first output and the second output; and a gain resistor connected between the second input and the fourth input. The driver further includes two substantially similar current feedback resistors, connected between the gain resistor and the series resistor.

9 Claims, 4 Drawing Sheets

LINE DRIVER WITH OUTPUT IMPEDANCE SYNTHESIS

CROSS-REFERENCE TO RELATED APPLICATIONS

This application claims the benefit of U.S. Provisional Patent Application 60/234,882, filed Sep. 25, 2000, which is incorporated herein by reference.

FIELD OF THE INVENTION

The present invention relates generally to transmission line drivers, and specifically to line drivers for data transceivers.

BACKGROUND OF THE INVENTION

Digital Subscriber Line (DSL) systems are commonly used as one of the methods of transmitting data when there is a wired connection, such as a twisted wired pair, between a transmitter and a receiver. Modems which operate in an Asymmetric DSL (ADSL) mode typically use a multitone signaling technique known as discrete multitone (DMT) signaling, and a DMT signal may be considered to be composed of a large number of sinusoidal signals. Each sinusoidal signal has a relatively small varying amplitude and phase, but the DMT signal which is the sum of the sinusoidal signals typically has a large dynamic range. In other words, even though the average signal voltage amplitude is low, the DMT signal contains high and infrequent voltage peaks. To avoid signal distortion, the peaks must be transmitted and received accurately.

Typical ADSL modems utilize a relatively high voltage power supply in order to transmit the DMT signal without distortion. Accordingly, line drivers of typical modems use power inefficiently, since most of the time the signal being sent has a low voltage amplitude. The resultant low efficiency of the line drivers means that the power consumed is large. Thus, when many modems must be deployed in a single location, as is the case, for example, in the central office of a regional telephone company, the heat generated because of the low modem efficiency limits the number of modems that can be installed in a given space.

For efficient operation, all modems need to have good impedance matching at the output of the modem. Typically, a resistor in series with the output of an operational amplifier, which acts as a line driver signal amplifier, is used to define the output impedance, which is set equal to the load impedance to achieve good impedance matching. In this situation the resistor dissipates half the power delivered by the amplifier, and the load only receives half of the amplifier's voltage output.

Methods are known in the art to decrease the power consumption of line drivers for signals with a high dynamic range. In an article entitled "Line Driver Economically Synthesizes Impedance," by Koren, in the Jan. 6, 1994, issue of *Electronic Design News*, which is incorporated herein by reference, there is a description of a method of synthesizing the output impedance so as to reduce the value of the resistor in series with the output of an operational amplifier. The method utilizes two feedback loops, both using resistors. In order for the driver to work correctly, all resistors in the system must have very close tolerances and must be carefully matched.

European Patent Application EP 0901221A1, to Dobbelaere et al., describes a differential output amplifier system for coupling a balanced two-operational amplifier system to a load. The system comprises two feedback loops for each of the amplifiers of the system, the loops measuring signals across a series resistor between the output of each amplifier and the load. The system measures differences in the two feedback loops. The system synthesizes an output impedance using these differences, and the accuracy of the synthesized output falls rapidly as the value of the series resistor is reduced.

SUMMARY OF THE INVENTION

It is an object of some aspects of the present invention to provide line driver apparatus having reduced power consumption.

It is a further object of some aspects of the present invention to provide line driver apparatus having a synthesized output impedance that is relatively insensitive to variations in values of components of the apparatus and can thus be produced using low-cost components.

It is a yet further object of some aspects of the present invention to provide a line driver hybrid circuit, for use within a modem, which delivers a high amplitude received signal to the modem with while providing a high rejection of a transmitted signal.

In some preferred embodiments of the present invention, a line driver for a modem comprises a balanced circuit. The balanced circuit comprises two substantially similar transmit circuits, both referenced to an effective ground, and two substantially similar receive circuits also referenced to the effective ground. Each transmit circuit comprises an operational amplifier coupled to a load and then to a low-value resistor connected in series with the load. The load preferably comprises a complex impedance load magnetically coupled to a line driven by the line driver. A voltage generated on the series resistor is fed back to the amplifier in the respective transmit circuit. One side of the series resistor is connected to the effective ground, so that the feedback voltage from the other side of the resistor is directly referenced to the effective ground. Thus, unlike other line drivers known in the art, no subtraction is necessary to generate the feedback voltage, so that the feedback voltage is relatively insensitive to variation of component values in the circuit.

In preferred embodiments of the present invention, each transmit circuit comprises two feedback branches to the respective operational amplifier, one responding to the current and the other responding to the voltage in the transmit circuit. Each receive circuit comprises its own operational amplifier having a balancing network to match the line impedance. By matching the line impedance, the balancing network achieves high rejection at the receive circuits of signals transmitted by the transmit circuits.

Values of components within preferred embodiments of the present invention can be set so as to achieve:

High signal rejection from a transmit port to a receive port;

Negligible voltage loss from an operational amplifier output to a line driver circuit output;

Synthesis of a predefined output gain; and

High received signal voltage gain.

As a consequence, modems constructed in accordance with such preferred embodiments can be made to operate with optimal efficiency.

There is therefore provided, according to a preferred embodiment of the present invention, a line driver for coupling a data transceiver to a line, including:

a first amplifier having a first input and a second input and a first output coupled to a first side of the line, the first input being coupled to a first input terminal;

a second amplifier having a third input and a fourth input and a second output coupled to a second side of the line, the third input being coupled to a second input terminal;

a first voltage feedback resistor, having a first voltage feedback resistance, connected between the first output and the second input;

a second voltage feedback resistor, having a resistance substantially equal to the first voltage feedback resistance, connected between the second output and the fourth input;

a series resistor, having a series resistance, and having a first side coupled to the first output and a second side coupled to the second output;

a gain resistor having a first side connected to the second input and a second side connected to the fourth input;

a first current feedback resistor, having a current feedback resistance, connected between the first side of the gain resistor and the first side of the series resistor; and a second current feedback resistor, having a resistance substantially equal to the current feedback resistance, connected between the second side of the gain resistor and the second side of the series resistor.

Preferably, the line driver includes a transformer, including:

a first primary coil connected between the first output and the first side of the series resistor;

a second primary coil connected between the second output and the second side of the series resistor; and a secondary coil connected between the first side and the second side of the line.

Further preferably, the line driver includes:

a receive circuit, including:

a third amplifier having a fifth input and a sixth input and a third output coupled to a first output terminal;

a fourth amplifier having a seventh input and an eighth input coupled to the sixth input and a fourth output coupled to a second output terminal;

a third voltage feedback resistor, having a second voltage feedback resistance, connected between the third output and the fifth input;

a fourth voltage feedback resistor, having a resistance substantially equal to the second voltage feedback resistance, connected between the fourth output and the seventh input;

a first receive impedance, having a receive reactance, connected between the fifth input and the first side of the series resistor;

a second receive impedance, having a reactance substantially equal to the receive reactance, connected between the seventh input and the second side of the series resistor;

a first balancing impedance, having a balancing reactance, connected between the fifth input and the second output; and a second balancing impedance, having a reactance substantially equal to the balancing reactance, connected between the seventh input and the first output.

Preferably, a value Zbal of the balancing reactance is substantially equal to a value of an expression $$\frac{Z_1 \cdot R_{rx}}{R_s},$$

wherein $Z_l$ is substantially equal to a value of a load impedance of the line driver, $R_{rx}$ is substantially equal to the receive reactance, and $R_s$ is substantially equal to half the series resistance.

Further preferably, an output voltage at the third output is substantially equal to a value of an expression $$\frac{2 \cdot V_s \cdot R_{xgain} \cdot R_s}{R_{syn} \cdot R_{rx}},$$

wherein $R_{syn}$ is substantially equal to a value of an output impedance of the first amplifier, $R_s$ is substantially equal to half the series resistance, $R_{xgain}$ is substantially equal to the second voltage feedback resistance, $R_{rx}$ is substantially equal to the receive reactance, and $V_s$ is substantially equal to a driving voltage between the first output and the first side of the series resistance.

Preferably, the first balancing impedance includes a first balancing resistor, and the second balancing impedance includes a second balancing resistor.

Further preferably, the first balancing impedance includes a first plurality of resistors and a second plurality of capacitors, and the second balancing impedance includes a third plurality of resistors and a fourth plurality of capacitors.

Preferably, an output impedance $Z_{out}$ of the driver is substantially equal to a value of an expression $$R_s \cdot \left(\frac{R_{vf}}{R_{cf}} + 1\right),$$

wherein $R_s$ is substantially equal to half the series resistance, $R_{vf}$ is substantially equal to the voltage feedback resistance, and $R_{cf}$ is substantially equal to the current feedback resistance.

There is further provided, according to a preferred embodiment of the present invention, a method for providing a line driver for coupling a data transceiver to a line, inlcuding:

coupling a first amplifier having a first input and a second input and a first output to a first side of the line, the first input being coupled to a first input terminal;

coupling a second amplifier having a third input and a fourth input and a second output to a second side of the line, the third input being coupled to a second input terminal;

connecting a first voltage feedback resistor, having a first voltage feedback resistance, between the first output and the second input;

connecting a second voltage feedback resistor, having a resistance substantially equal to the first voltage feedback resistance, between the second output and the fourth input;

coupling a first side of a series resistor, having a series resistance, to the first output;

coupling a second side of the series resistor to the second output;

connecting a first side of a gain resistor to the second input;

connecting a second side of the gain resistor to the fourth input;

connecting a first current feedback resistor, having a current feedback resistance, between the first side of the gain resistor and the first side of the series resistor; and connecting a second current feedback resistor, having a resistance substantially equal to the current feedback resistance, between the second side of the gain resistor and the second side of the series resistor.

The present invention will be more fully understood from the following detailed description of the preferred embodiments thereof, taken together with the drawings, in which:

DETAILED DESCRIPTION OF PREFERRED EMBODIMENTS

Figure 1:
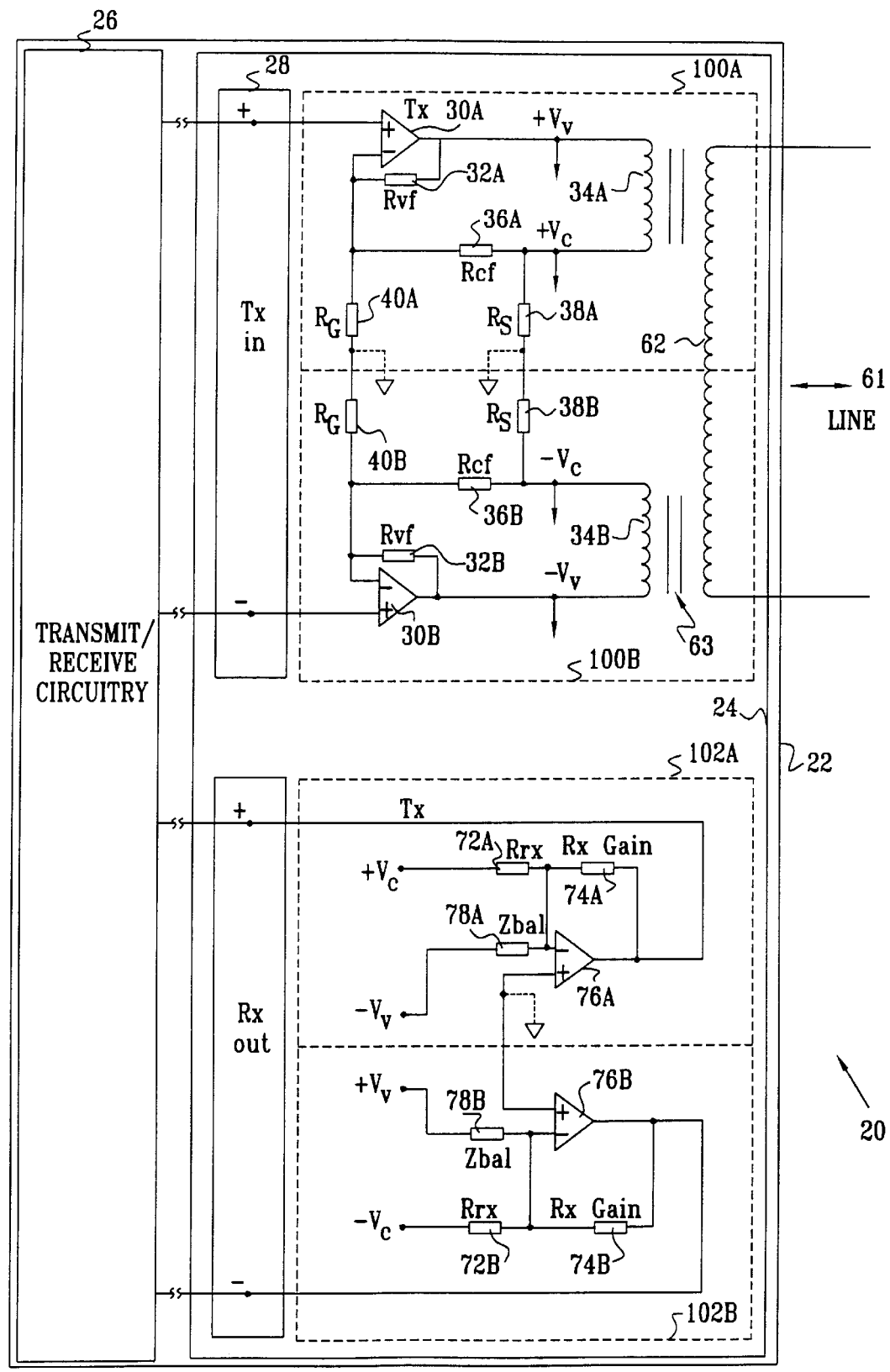
FIG. 1 is a schematic circuit diagram of a line driver, according to a preferred embodiment of the present invention.

Reference is now made to FIG. 1, which is a schematic circuit diagram of a line driver 24, according to a preferred embodiment of the present invention. A modem 22 which acts as a data transceiver comprises transmit/receive circuitry 26 and line driver 24. Circuitry 26 is coupled via line driver 24 to a line 61. Modem 22 is preferably an Asymmetric Digital Subscriber Line (ADSL) modem transmitting digital multitone (DMT) signals. Alternatively, modem 22 is any other industry-standard or custom-built modem. Further alternatively, line driver 24 may be used together with transceivers of other types, not necessarily modems.

The arrangement of FIG. 1 is generally similar to that of U.S. patent application Ser. No. 09/470,777 to Koren, which is assigned to the assignee of the present invention, and whose disclosure is incorporated herein by reference. The disclosure therein describes a line driver for coupling a data transceiver to a line having a load impedance. The driver comprises a transformer with a primary coil and a secondary coil with a turns ratio of N:1 therebetween, and uses the transformer to synthesize an output impedance matching the load impedance.

Line driver 24 is most preferably a balanced system, comprising a pair of substantially similar transmit circuits 100A and 100B, and a pair of substantially similar receive circuits 102A and 102B, each of the pairs being coupled together. The descriptions hereinbelow of transmit circuit 100A and receive circuit 102A substantially apply to transmit circuit 100B and receive circuit 102B, with appropriate change of suffix.

Transmit circuit 100A comprises an operational amplifier 30A, which receives a signal at its non-inverting input from circuitry 26. Amplifier 30A has a first feedback circuit resistor $R_{vf}$ 32A from its output to its non-inverting input, so that the resistor acts as a voltage feedback circuit. Amplifier 30A delivers its output into a load 34A, preferably a primary coil of an output transformer 63. Transformer 63 comprises a second load 34B which is substantially similar to load 34A. A turns ratio of the combined primary coils to a secondary coil 62 of transformer 63 is most preferably 1:1. Load 34A, having an impedance $Z_1$, is in series with a resistor $R_s$ 38A which has an impedance substantially less than the impedance of the load, i.e., $Z_1 >> R_s$, and which is coupled to an effective ground, as is shown in FIG. 1 by a broken line. The voltage across resistor 38A, generated at the junction of load 34A and resistor 38A, is also transferred via a current feedback resistor $R_{cf}$ 36A to the inverting input of amplifier 30A. Thus the current through load 34A and resistor 38A corresponds to the voltage developed by resistor 38A, so that load 34A, resistor 38A and resistor 36A comprise a current feedback circuit. A resistor $R_g$ 40A, which acts as a negative feedback and as a gain setting resistor, is coupled between the inverting input of amplifier 30A and the effective ground. It will be appreciated that the effective ground referred to herein corresponds to a point in line driver 24 having a substantially constant reference potential equal to zero.

Receive circuit 102A comprises a hybrid amplifier 76A, which is coupled to the effective ground at its non-inverting input. At its inverting input, amplifier 76A receives, via a resistor $R_{rx}$ 72A, a current value sampled from resistor 38A comprised in transmit circuit 100A. The output of amplifier 30B, comprised in transmit circuit 100B, is also fed via a balancing impedance $Z_{bal}$ 78A to the inverting input of amplifier 76A, which acts as a summing junction. It will be appreciated that receiving the output of amplifier 30B at the inverting input of amplifier 76A generates substantially the same results as receiving an inverted output of amplifier 30A at the inverting input. The output of amplifier 76A is transferred to circuitry 26. A gain of amplifier 76A is set by a feedback resistor $R_{xgain}$ 74A, coupled between the output and the inverting input of the amplifier.

Figure 2:
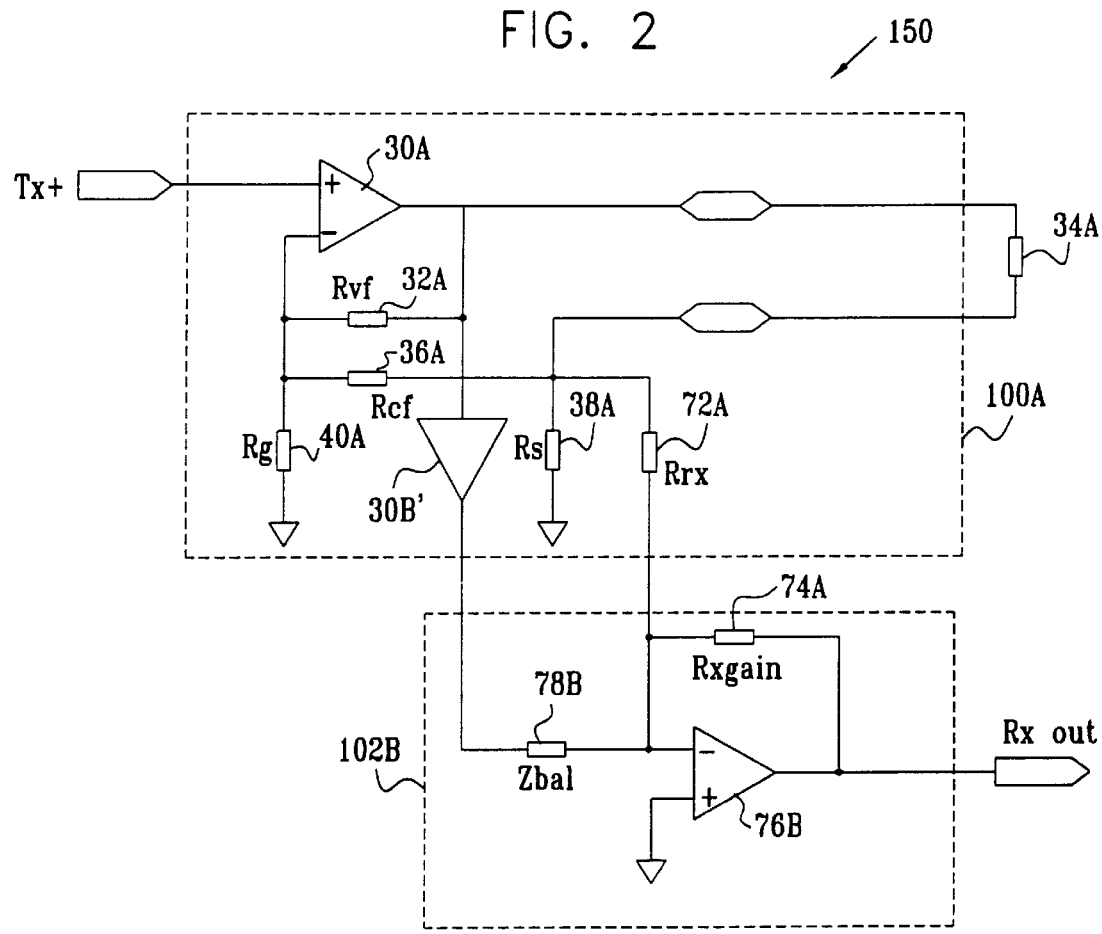
FIG. 2 is a single-ended unbalanced equivalent circuit, corresponding to a portion of the circuit of FIG. 1, according to a preferred embodiment of the present invention.

FIG. 2 is a single-ended unbalanced equivalent circuit 150, corresponding to a portion of the line driver of FIG. 1, which is used in analyzing the performance and/or synthesizing values in the circuit of FIG. 1, according to a preferred embodiment of the present invention. In circuit 150, the effective ground referred to with reference to FIG. 1 is assumed to be a ground having a potential substantially equal to zero. Circuit 150 shows transmit circuit 100A coupled to receive circuit 102B, substantially as is shown hereinabove for driver 24 with reference to FIG. 1. In addition, an inverter 30B' is coupled from the output of amplifier 30A to impedance 78B of receive circuit 102B. The output of inverter 30B', an inversion of the output of amplifier 30A, corresponds to the output of amplifier 30B of transmit circuit 100B. Circuit 150 is used hereinbelow to derive values of components in driver 24.

Figure 3:
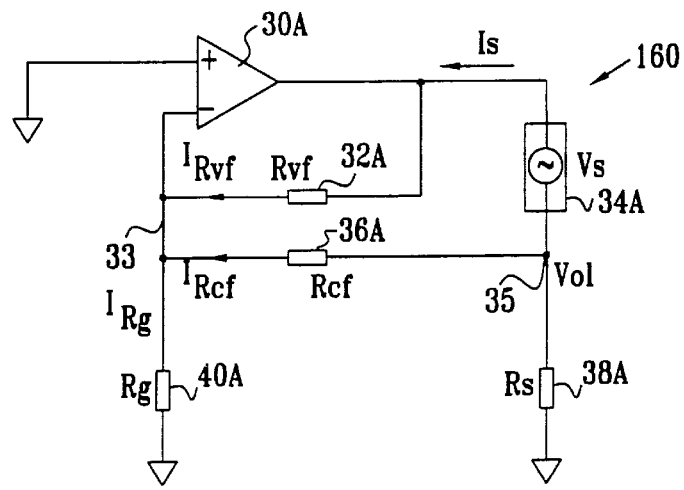
FIG. 3 is an equivalent circuit, derived from the circuit of FIG. 2, according to a preferred embodiment of the present invention.

FIG. 3 is an equivalent circuit 160, derived from circuit 150, according to a preferred embodiment of the present invention. Circuit 160 is used to derive a value of an output impedance $Z_{out}$ of transmit circuit 100A, in terms of values of components of driver 24. In circuit 160 load 34A is assumed to generate a voltage $V_s$ and a current $I_s$. The input to amplifier 30A at its non-inverted input is assumed to be grounded. Since amplifier 30A is a high-gain amplifier with negative feedback, the input voltage of the amplifier at its inverting input is close to ground, i.e., $V_n=0$. Thus, $$I_{R_g}=0 \tag{1}$$

where $I_{R_g}$ represents the current in resistor 40A, so that the potential at a junction 33 between resistor 32A and resistor 36A is substantially 0.

By consideration of currents flowing in junction 33, $$I_{R_{vf}}=I_{R_{cf}} \tag{2}$$

where $I_{R_{vf}}$, $I_{R_{cf}}$ represent the currents in resistors 32A and 36A respectively.

Resistors 32A and 36A act as a voltage divider for voltage Vs generated by load 34A. Thus the voltage across $R_{cf}$, corresponding to the potential $V_{ol}$ at a junction 35 between load 34A and resistor 38A, is given by:

$$V_{ol} = V_s \cdot \frac{R_{cf}}{(R_{vf} + R_{cf})} \tag{3}$$

Since the potential at junction 33 is substantially equal to 0, resistors 36A and 38A can be considered to be in parallel, having a combined resistance given by:

$$R_{//} = \frac{R_s \cdot R_{cf}}{R_s + R_{cf}} \tag{4}$$

The current flowing through junction 35 is equal to $I_s$, which can be equated as follows:

$$I_s = \frac{V_{ol}}{R_{//}} \tag{5}$$

and substituting equations (3) and (4) into equation (5) gives:

$$I_s = V_s \cdot \frac{(R_s + R_{cf})}{R_s \cdot (R_{vf} + R_{cf})} \tag{6}$$

By definition, the impedance of load 34A, $Z_{out}$, is equal to $$\frac{V_s}{I_s},$$

so that from equation (6)

$$Z_{out} = \frac{R_s \cdot (R_{vf} + R_{cf})}{(R_s + R_{cf})} \tag{7}$$

When $R_{cf} \gg R_s$, equation (7) can be rewritten as:

$$Z_{out} = R_s \cdot \left( \frac{R_{vf}}{R_{cf}} + 1 \right) \tag{8}$$

Thus, by setting a relatively low value of $R_s$ in series with the output of amplifier 30A, and by adjusting $R_{vf}$ and $R_{cf}$ accordingly, $Z_{out}$ can be matched. The low value of $R_s$ means that losses in Rs are minimized. It will be appreciated that equation (8) is relatively insensitive to variations of values of $R_s$, $R_{vf}$, and $R_{cf}$, unlike systems where resistor values are subtracted.

Figure 4:
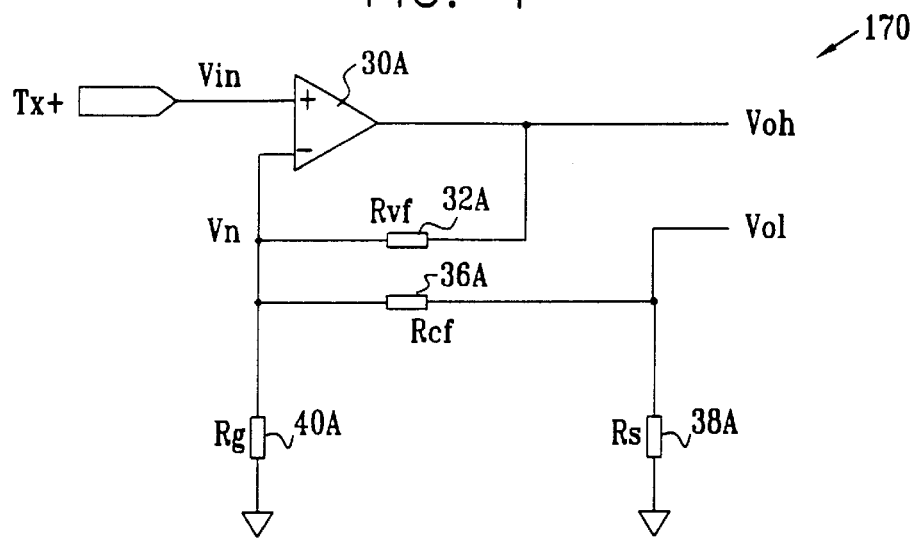
FIG. 4 is another equivalent circuit, derived from the circuit of FIG. 2, according to a preferred embodiment of the present invention.

FIG. 4 is an equivalent circuit 170, derived from circuit 150, according to a preferred embodiment of the present invention. Circuit 170 is used to derive a value of an transmit gain $T_x$ of transmit circuit 100A, in terms of values of components of driver 24. In a first step, the gain $A_{inf}$ under open circuit conditions, i.e., with $Z_{load}$ very large, is found.

The input to amplifier 30A at its non-inverted input is assumed to be $V_{in}$. Since amplifier 30A is a high-gain amplifier with negative feedback, the input voltage $V_n$ of the amplifier at its inverting input is close to $V_{in}$, i.e., $$V_n=V_{in} \tag{9}$$

The voltage across $Z_{load}$ is given by the difference of the two potentials across $Z_{load}$, i.e., $$V_{out}=V_{oh}-V_{ol} \tag{10}$$

The non-inverting gain G of amplifier 30A is dependent on the value of feedback resistor 32A, $R_{vf}$, and a resistance R between the inverting input and ground according to the equation:

$$G = \frac{V_{oh}}{V_{in}} = 1 + \frac{R_{vf}}{R} \tag{11}$$

Resistance R is the resistance generated by $R_g$, $R_{cf}$, and $R_s$, i.e., $$R = \frac{R_g \cdot (R_{cf} + R_s)}{R_g + (R_{cf} + R_s)} \tag{12}$$

Substituting equation (12) in equation (11) gives $$\frac{V_{oh}}{V_{in}} = 1 + \frac{R_{vf} \cdot (R_g + (R_{cf} + R_s))}{R_g \cdot (R_{cf} + R_s)} \tag{13}$$

Consideration of the potentials across resistors 36A and 38A, and using equation (9), gives:

$$\frac{V_{ol}}{V_{in}} = \frac{R_s}{(R_{cf} + R_s)} \tag{14}$$

Subtracting equation (13) from equation (14) gives an expression for the open-loop gain $A_{inf}$:

$$A_{inf} = \frac{V_{out}}{V_{in}} = \frac{V_{oh} - V_{ol}}{V_{in}} = 1 + \frac{R_{vf} \cdot (R_g + (R_{cf} + R_s))}{R_g \cdot (R_{cf} + R_s)} - \frac{R_s}{(R_{cf} + R_s)},$$

which simplifies to:

-continued $$A_{inf} = \frac{(R_{cf} + R_{vf})}{(R_{cf} + R_s)} + \frac{R_{vf}}{R_g} \quad (15)$$

The right side of equation (15) comprises two terms, a term $$\frac{(R_{cf} + R_{vf})}{(R_{cf} + R_s)}$$

which gives a minimum value of the open circuit gain, and a term $$\frac{R_{vf}}{R_g}$$

which can be adjusted to a desired value of $A_{inf}$ by choosing $R_g$.

Amplifier 30A can be considered to have at its output a virtual output impedance Zout in series with load resistor $Z_{load}$. Thus, an actual voltage gain $A_v$ for a finite load $Z_{load}$ is given by:

$$A_v = A_{inf} \cdot \frac{Z_{load}}{(Z_{out} + Z_{load})} \quad (16)$$

Figure 5:
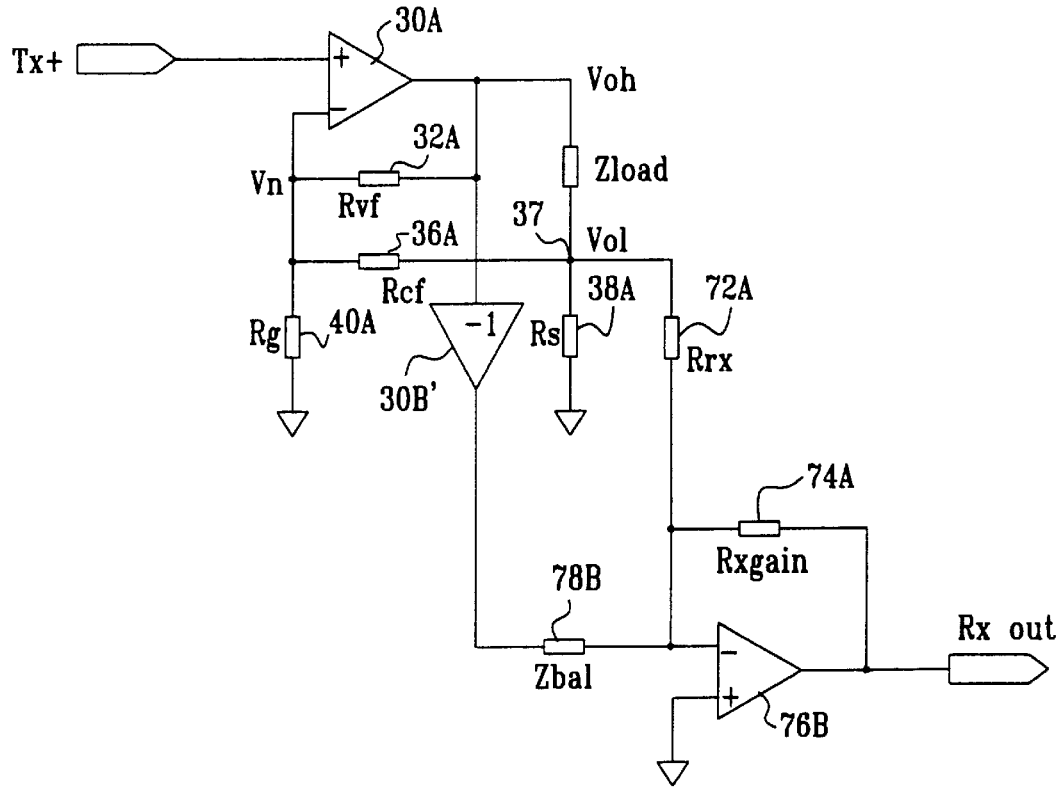
FIG. 5 is a further equivalent circuit, derived from the circuit of FIG. 2, according to a preferred embodiment of the present invention.

FIG. 5 is an equivalent circuit 180, derived from circuit 150, according to a preferred embodiment of the present invention. Circuit 180 is used to derive values of components of transmit circuit 100A, in order to achieve a high transmit to receive isolation.

It is assumed that the value of $R_s$ is set to obey the following conditions:

$$R_s \ll Z_1, R_s \ll R_{cf}, \text{ and } R_s \ll R_{rx}. \quad (17)$$

so that a current $I_{Z_1}$, through the load, is given by:

$$I_{Z_1} = \frac{V_{oh}}{Z_1} \quad (18)$$

Consideration of the current through junction 37 gives:

$$I_{Z_1} = I_{R_s} \quad (19)$$

Using equations (18) and (19), the potential across resistor 38 is thus given by:

$$V_{ol} = R_s \cdot I_{R_s} = R_s \cdot \frac{V_{oh}}{Z_1} \quad (20)$$

From equation (20), a current $I_{Rx}$, through resistor 72, is given by:

$$I_{R_x} = \frac{V_{ol}}{R_{rx}} = \frac{R_s \cdot V_{oh}}{Z_1 \cdot R_{rx}} \quad (21)$$

A current $I_{zbal}$ through impedance 78B, from inverter 30B', is given by:

$$I_{Z_{bal}} = -\frac{V_{oh}}{Z_{bal}} \quad (22)$$

The currents of equations (21) and (22) are summed by the inverting input of amplifier 76B, and when their sum is equal to 0, substantially no transmit signal appears at the output of amplifier 76B. Thus $$\frac{R_s \cdot V_{oh}}{Z_1 \cdot R_{rx}} = \frac{V_{oh}}{Z_{bal}} \text{ which rearranges to: } Z_{bal} = \frac{Z_1 \cdot R_{rx}}{R_s} \quad (23)$$

Most preferably, an $R_{rx}$ value is chosen to obtain a predetermined receive path gain. $Z_{bal}$ is then calculated according to equation (23) to achieve a high isolation between transmit and receive.

Figure 6:
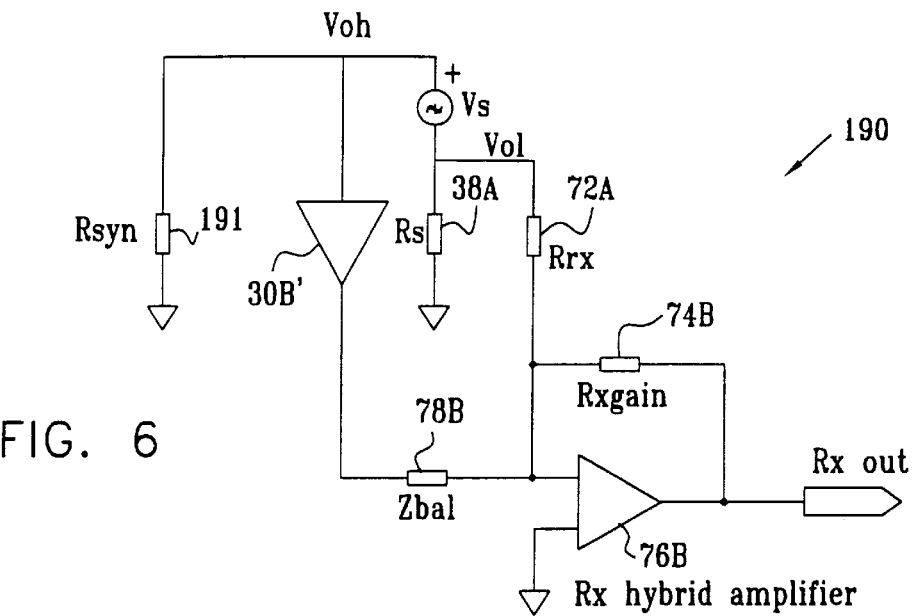
FIG. 6 is another equivalent circuit, derived from the circuit of FIG. 2, according to a preferred embodiment of the present invention.

FIG. 6 is an equivalent circuit 190, derived from circuit 150, according to a preferred embodiment of the present invention. Circuit 190 is used to derive values of a gain of receive circuit 102B.

A resistor $R_{syn}$ 191 substitutes for amplifier 30A and its associated resistors. Resistor 191 has a value substantially equal to the value of the output impedance synthesized by amplifier 30A, i.e., $Z_1$. The current injected $I_{R_{rx}}$ into the inverting input of amplifier 76B via resistor 72A is given by:

$$I_{R_{rx}} = \frac{V_{R_s}}{R_{rx}} \quad (24)$$

Resistors 191 and 38A form a series circuit having a driving voltage of $V_s$, and the potential at the junction of the resistors equal to zero. The potential at the other end of resistor 38A, i.e., the voltage across resistor 38A, is then given by:

$$V_{R_s} = -V_s \cdot \frac{R_s}{(R_s + R_{syn})} \quad (25)$$

and substituting equation (25) into equation (24) gives:

$$I_{R_{rx}} = \frac{-V_s \cdot R_s}{(R_s + R_{syn}) \cdot R_{rx}} \quad (26)$$

Equation (26) simplifies, if $R_{syn} \gg R_s$, to:

$$I_{R_{rx}} = \frac{-V_s \cdot R_s}{R_{syn} \cdot R_{rx}} \quad (27)$$

The current injected into the inverting input of amplifier 76B through impedance 78B is given by:

$$I_{Z_{bal}} = -\frac{V_{oh}}{Z_{bal}} \quad (28)$$

From the series circuit formed by resistors 191 and 38A, $$V_{oh} = V_s \cdot \frac{R_{syn}}{(R_{syn} + R_s)} \quad (29)$$

which if $R_{syn} \gg R_s$ simplifies to $V_{oh} = V_s$

Assuming that $Z_{bal}$ is set according to equation (23) above, and since $R_{syn} = Z_1$, $$Z_{bal} = \frac{Z_1 \cdot R_{rx}}{R_s} = \frac{R_{syn} \cdot R_{rx}}{R_s} \qquad (30)$$

Thus equation (28), by substitution of equations (29) and (30), becomes:

$$I_{Z_{bal}} = -\frac{V_s \cdot R_s}{R_{syn} \cdot R_{rx}} \qquad (31)$$

Currents $I_{Z_{bal}}$ and $I_{R_{rx}}$ are summed by the non-inverting input of amplifier 74B. As is seen from equations (27) and (31), the two currents are substantially equal and are in phase, so that the currents add. An expression for the voltage output from amplifier 76B is thus:

$$V_{R_x out} = -(I_{R_{rx}} + I_{Z_{bal}}) \cdot R_{xgain} \qquad (32)$$

where $R_{xgain}$ is the value of a resistor 74B which sets a gain for amplifier 76B.

Substituting from equations (27) and (31) into equation (32) gives:

$$V_{R_x out} = \frac{2 \cdot V_s \cdot R_{xgain} \cdot R_s}{R_{syn} \cdot R_{rx}} \qquad (33)$$

It will be appreciated that because the two currents into the inverting input of amplifier 76B are in-phase, the gain of the amplifier, and thus the output voltage of the amplifier, are significantly higher than circuits where the two currents are out-of-phase, or circuits where only one of the currents exist.

Returning to FIG. 1, it will be appreciated that impedances 78A and 78B may be comprised of one or more reactive and/or non-reactive elements. For example, in some preferred embodiments of the present invention, impedances 78A and 78B are each a single resistor having a value approximately equal to 1 kΩ, with an actual value being chosen corresponding to a median frequency of a frequency range over which modem 22 operates. Typical values in these preferred embodiments are of the order of the following values: Rvf=1 kΩ; Rcf=50Ω; Rg=150Ω; Rs=2.5Ω; and Rrx=50Ω.

Figure 7:
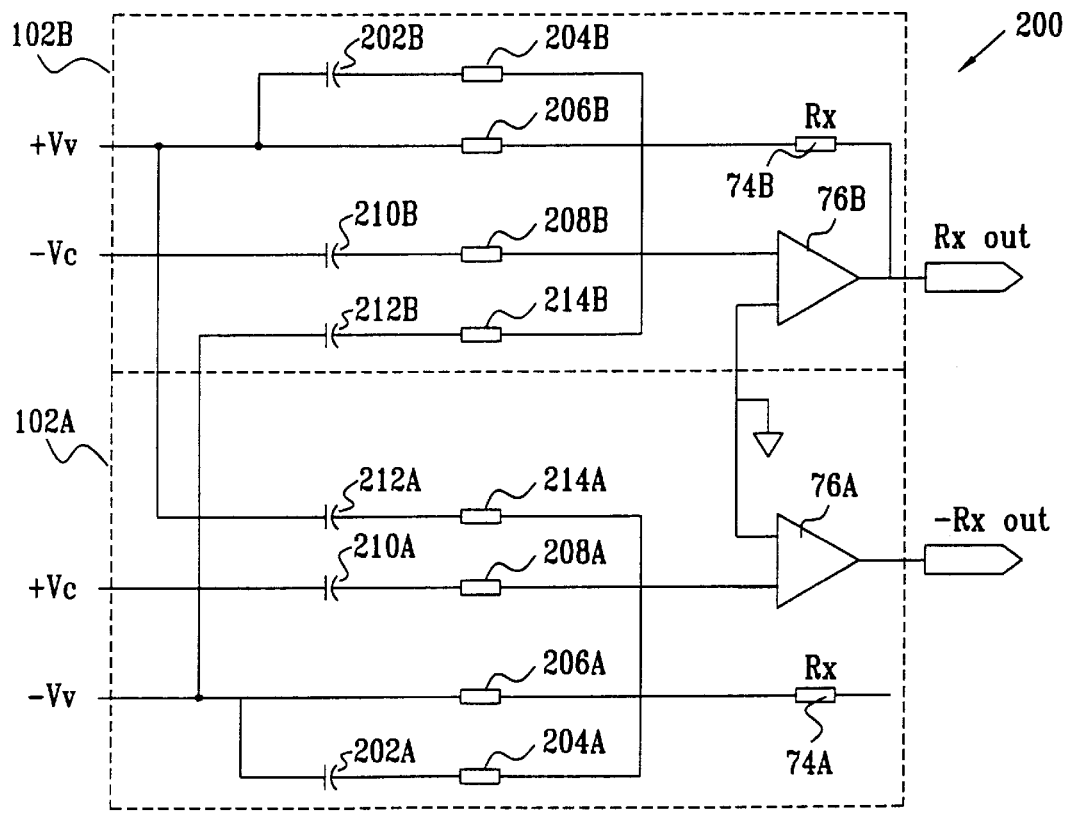
FIG. 7 shows a configuration of impedances comprised in the circuit of FIG. 1, according to an alternative preferred embodiment of the present invention

FIG. 7 shows a configuration of impedances 78A and 78B, according to an alternative preferred embodiment of the present invention. A system 200, comprising receive circuits 102A and 102B, includes arrays of capacitors and resistors. Capacitors 202A, 202B, 212A, 212B, and resistors 204A, 204B, 206A, 206B, 214A, 214B replace impedances 78A and 78B. The values of capacitors 202A, 202B, 212A, 212B, and resistors 204A, 204B, 206A, 206B, 214A, 214B, are chosen, by methods known in the art, in order to improve the hybrid rejection. Similarly, a capacitor 210A and a resistor 208A, and a capacitor 210B and a resistor 208B, replace resistors 72A and 72B respectively.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A line driver for coupling a data transceiver to a line, comprising:

a first amplifier having a first input and a second input and a first output coupled to a first side of the line, the first input being coupled to a first input terminal;

a second amplifier having a third input and a fourth input and a second output coupled to a second side of the line, the third input being coupled to a second input terminal;

a first voltage feedback resistor, having a first voltage feedback resistance, connected between the first output and the second input;

a second voltage feedback resistor, having a second voltage feedback resistance substantially equal to the first voltage feedback resistance, connected between the second output and the fourth input;

a series resistor, having a series resistance, and having a first series resistor side coupled to the first output and a second series resistor side coupled to the second output;

a gain resistor having a first gain resistor side connected to the second input and a second gain resistor side connected to the fourth input;

a first current feedback resistor, having a first current feedback resistance, connected between the first side of the gain resistor and the first side of the series resistor; and a second current feedback resistor, having a second current feedback resistance substantially equal to the first current feedback resistance, connected between the second side of the gain resistor and the second side of the series resistor.

2. A line driver according to claim 1, and comprising:

a transformer, comprising:

a first primary coil connected between the first output and the first side of the series resistor;

a second primary coil connected between the second output and the second side of the series resistor; and a secondary coil connected between the first side and the second side of the line.

3. A line driver according to claim 1, and comprising:

a receive circuit, comprising:

a third amplifier having a fifth input and a sixth input and a third output coupled to a first output terminal;

a fourth amplifier having a seventh input and an eighth input coupled to the sixth input and a fourth output coupled to a second output terminal;

a third voltage feedback resistor, having a third voltage feedback resistance, connected between the third output and the fifth input;

a fourth voltage feedback resistor, having a fourth voltage feedback resistance substantially equal to the third voltage feedback resistance, connected between the fourth output and the seventh input;

a first receive impedance, having a first receive reactance, connected between the fifth input and the first side of the series resistor;

a second receive impedance, having a second receive reactance substantially equal to the first receive reactance, connected between the seventh input and the second side of the series resistor;

a first balancing impedance, having a first balancing reactance, connected between the fifth input and the second output; and a second balancing impedance, having a second balancing reactance substantially equal to the first balancing reactance, connected between the seventh input and the first output.

4. A line driver according to claim 3, wherein a value Zbal of the first balancing reactance is substantially equal to a value of an expression $$\frac{Z_1 \cdot R_{rx}}{R_s},$$

wherein:
- $Z_1$ is substantially equal to a value of a load impedance of the line driver,
- $R_{rx}$ is substantially equal to a value of the first receive reactance, and
- $R_s$ is substantially equal to a value of half the series resistance.

5. A line driver according to claim 3, wherein an output voltage at the third output is substantially equal to a value of an expression $$\frac{2 \cdot V_s \cdot R_{xgain} \cdot R_s}{R_{syn} \cdot R_{rx}},$$

wherein:
- $R_{syn}$ is substantially equal to a value of an output impedance of the first amplifier,
- $R_s$ is substantially equal to a value of half the series resistance,
- $R_{xgain}$ is substantially equal to a value of the third voltage feedback resistance,
- $R_{rx}$ is substantially equal to a value of the first receive reactance, and
- $V_s$ is substantially equal to a driving voltage between the first output and the first side of the series resistance.

6. A line driver according to claim 3, wherein the first balancing impedance comprises a first balancing resistor, and wherein the second balancing impedance comprises a second balancing resistor.

7. A line driver according to claim 3, wherein the first balancing impedance comprises a first plurality of resistors and a second plurality of capacitors, and wherein the second balancing impedance comprises a third plurality of resistors and a fourth plurality of capacitors.

8. A line driver according to claim 1, wherein an output impedance $Z_{out}$ of the driver is substantially equal to a value of an expression $$R_s \cdot \left(\frac{R_{vf}}{R_{cf}} + 1\right),$$

wherein:
- $R_s$ is substantially equal to a value of half the series resistance,
- $R_{vf}$ is substantially equal to a value of the first voltage feedback resistance, and
- $R_{cf}$ is substantially equal to a value of the first current feedback resistance.

9. A method for providing a line driver for coupling a data transceiver to a line, comprising:
- coupling a first amplifier having a first input and a second input and a first output to a first side of the line, the first input being coupled to a first input terminal;
- coupling a second amplifier having a third input and a fourth input and a second output to a second side of the line, the third input being coupled to a second input terminal;
- connecting a first voltage feedback resistor, having a first voltage feedback resistance, between the first output and the second input;
- connecting a second voltage feedback resistor, having a second voltage feedback resistance substantially equal to the first voltage feedback resistance, between the second output and the fourth input;
- coupling a first side of a series resistor, having a series resistance, to the first output;
- coupling a second side of the series resistor to the second output;
- connecting a first side of a gain resistor to the second input;
- connecting a second side of the gain resistor to the fourth input;
- connecting a first current feedback resistor, having a first current feedback resistance, between the first side of the gain resistor and the first side of the series resistor; and
- connecting a second current feedback resistor, having a second current feedback resistance substantially equal to the first current feedback resistance, between the second side of the gain resistor and the second side of the series resistor.

* * * * *